United States Patent
Jiarong (10) Patent No.: US 10,840,710 B2
(45) Date of Patent: Nov. 17, 2020

(54) DEVICE CAPABLE OF ACHIEVING FAST CHARGE AND FAST DISCHARGE OF A VEHICLE EMERGENCY STARTING POWER SOURCE

(71) Applicant: USA Huanen International Group LLC, Las Vegas, NV (US)

(72) Inventor: Lin Jiarong, Shenzhen (CN)

(73) Assignee: USA Human International Group LLC, Las Vegas, NV (US)

( * ) Notice: Subject to any disclaimer, the term of this patent is extended or adjusted under 35 U.S.C. 154(b) by 359 days.

(21) Appl. No.: 15/926,944

(22) Filed: Mar. 20, 2018

(65) Prior Publication Data
US 2018/0278063 A1 Sep. 27, 2018

(30) Foreign Application Priority Data
Mar. 27, 2017 (CN) .......................... 2017 1 0188320

(51) Int. Cl.
*H02J 7/00* (2006.01)
*H01M 10/44* (2006.01)

(52) U.S. Cl.
CPC .......... *H02J 7/0003* (2013.01); *H01M 10/44* (2013.01); *H02J 7/00* (2013.01); *H02J 7/0072* (2013.01); *H02J 2207/20* (2020.01); *Y02T 10/7005* (2013.01)

(58) Field of Classification Search
CPC .......... H02J 7/0003; H02J 7/00; H02J 7/0072; H02J 2207/20; H01M 10/44
USPC .......................................................... 320/138
See application file for complete search history.

(56) References Cited

U.S. PATENT DOCUMENTS

| | | | |
|---|---|---|---|
| 6,285,539 B1 * | 9/2001 | Kashimoto | H02J 7/0072 323/908 |
| 9,509,160 B2 | 11/2016 | Zhao et al. | |
| 9,721,447 B2 | 8/2017 | Mese et al. | |
| 9,748,788 B2 | 8/2017 | Sporck et al. | |
| 2013/0191653 A1 | 7/2013 | Shih et al. | |
| 2013/0290765 A1 | 10/2013 | Waters et al. | |

(Continued)

FOREIGN PATENT DOCUMENTS

| | | |
|---|---|---|
| CN | 203850881 U | 9/2014 |
| CN | 204858674 U | 12/2015 |
| CN | 204978506 U | 1/2016 |

*Primary Examiner* — Nathaniel R Pelton
(74) *Attorney, Agent, or Firm* — Howard & Howard Attorneys PLLC (57) ABSTRACT

The present invention relates to a device capable of achieving fast charge and fast discharge of a vehicle emergency starting source, including an input module, a voltage input adjustment module, a battery module, a voltage output adjustment module, a first output module, a second output module and a third output module. In the device, SC8801 is adopted, which is capable of achieving an input power up to 24 W, thereby improving the practicability of the device. Meanwhile, Type-C QC3.0 protocol is adopted in the first output module, USB QC3.0 protocol is adopted for the second output module, and Type-C PD protocol is adopted for the third output module, to meet different charging needs and improve the practicality of the device. Moreover, the voltage input adjustment module can balance and convert the power, thereby reducing power consumption and loss, improving electricity conversion rate, and improving practical value of the device.

15 Claims, 4 Drawing Sheets

(56) References Cited

U.S. PATENT DOCUMENTS

2016/0336762 A1    11/2016  Hunter et al.
2017/0098942 A1     4/2017  Zeng
2017/0324241 A1*  11/2017  Lee ..................... H02J 7/0026
2018/0048170 A1*   2/2018  Sun ......................... H02J 7/00

* cited by examiner

DEVICE CAPABLE OF ACHIEVING FAST CHARGE AND FAST DISCHARGE OF A VEHICLE EMERGENCY STARTING POWER SOURCE

CROSS-REFERENCE TO RELATED APPLICATION

This application priority to Chinese Patent Application No. CN 201710188320.8, filed on Mar. 27, 2017, the disclosure of which are hereby incorporated by reference in its entirety and for all purposes.

TECHNICAL FIELD OF THE INVENTION

The present invention relates to the field of vehicle charging, and more particularly to a device capable of achieving fast charge and fast discharge of a vehicle emergency starting power source.

BACKGROUND OF THE INVENTION

With the rapid economic development, all kinds of new energy are beginning to be gradually applied, and electric vehicles have also been developed rapidly.

With the continuous popularization of electric vehicles, battery charging devices also appear, and in the existing battery charging devices, there are several problems:

1. as the battery set is formed by multiple series of 12 V/24 V batteries, it can only achieve fixed power input during charging and discharging, such as 14/1 A, 15 V/1 A and other inputs, while an input based on Type-C QC3.0 cannot be achieved;

2. an ordinary emergency starting power source, when used as a mobile power output, can only achieve a fixed 5 V/1 A or 5 V/2 A output, while and output with fast charging technology cannot be achieved;

3. an ordinary emergency starting power does not allow Type-C and Type-C protocols, nor does it support a function of charging for Mac Book and all Type-C mobile devices;

4. an ordinary emergency starting power does not allow 5 V/3.1 A/18 W/24 W based on Type-C, nor does it allow a QC2.0/QC3.0 output supporting up to 100 W, or a QC3.0/QC2.0 fast-charging output based on USB; and 5. an ordinary emergency starting power, in the direct realization of fast-charging technology, leads to a very large power loss and extremely serious overheating.

SUMMARY OF THE INVENTION

The technical problem to be solved in the present invention is: to provide a device capable of achieving fast charge and fast discharge of a vehicle emergency starting power source, so as to overcome the deficiencies of the prior art.

The technical solution adopted by the present invention to solve the technical problem is as follows: a device capable of achieving fast charge and fast discharge of a vehicle emergency starting source, comprising an input module, a voltage input adjustment module, a battery module, a voltage output adjustment module, a first output module, a second output module and a third output module, wherein, the input module is electrically connected to the battery module through the voltage input adjustment module, and the battery module is respectively connected to the first output module, the second output module and the third output module through the voltage output adjustment module.

The voltage output adjustment module comprises a voltage output circuit and an output current detection circuit; the output current detection circuit is electrically connected to the voltage output circuit; the output current detection circuit comprises the second FET, the third FET and the eighth resistor; the gate of the second FET is connected to the gate of the third FET; both the drain of the second FET and the drain of the third FET are grounded through the eighth resistor; and both the source of the second FET and the source of the third FET are connected to the wiring terminal; wherein, by controlling the conduction of the second field effect transistor (FET) and the third FET, the second FET and the third FET can collect the output current, and then, the output current is collected by collecting the output voltage from the drain of the second FET and from the drain of the third FET, thereby improving the reliability of the output circuit.

The QC3.0 protocol is adopted in the input module, the Type-C QC3.0 protocol is adopted in the first output module, the USB QC3.0 protocol is adopted for the second output module, and the Type-C PD protocol is adopted for the third output module.

Wherein, when fast charging is needed, the power source will be connected through the input module and using QC3.0 protocol, and then by the voltage input adjustment module, the input voltage and input power will be adjusted, so as to meet a variety of charging needs and improve the practicality of charging; then the adjusted voltage will be input to the battery module, so as to charge the battery; when fast discharging is needed, the battery module will output electricity, and by the voltage output adjustment module, the output voltage and output power of the adjusted, thereby improving the electricity conversion efficiency and charging efficiency; finally, different charging devices are connected through the first output module, the second output module and the third output module respectively, so as to improve the practicability of the device; the Type-C QC3.0 protocol is adopted in the first output module, the USB QC3.0 protocol is adopted for the second output module, and the Type-C PD protocol is adopted for the third output module, so as to meet different charging needs.

Specifically, the voltage output circuit comprises a first integrated circuit, a first capacitor, a second capacitor, a third capacitor, a fourth capacitor, a fifth capacitor, a sixth capacitor, a first resistor, a second resistor, a third resistor, a fourth resistor, a fifth resistor, a sixth resistor, a seventh resistor, an inductor, a first transistor, a second transistor, a first field effect transistor, a first diode, a second diode and a wiring terminal, wherein, the first integrated circuit is of the type FP5139; a first end of the first integrated circuit is connected to the sixth resistor and the seventh resistor; a second end of the first integrated circuit is grounded via the first capacitor and the first resistor respectively; a third end of the first integrated circuit is externally connected to a 12 V DC voltage source; a fourth end of the first integrated circuit is grounded through a second resistor; an eighth end of the first integrated circuit is grounded through a second capacitor; a seventh end of the first integrated circuit is grounded via a third capacitor and a third resistor respectively; a sixth end of the first integrated circuit is grounded; a fifth end of the first integrated circuit is, through the fourth resistor, respectively connected to the base of the first transistor and to the base of the second transistor; one end of the fifth resistor is grounded; the other end of the fifth resistor is respectively connected to the base of the first transistor and the base of the second transistor; the emitter of the first transistor is connected to the emitter of the second transistor; the collector of the first transistor is externally connected to an external 12 V DC voltage source; the collector of the second transistor is grounded; the collector of the first transistor is, through the schematic connection, respectively connected to the anode of the first diode and the cathode of the first diode; the source of the first field effect transistor (FET) is respectively connected to the anode of the first diode and the cathode of the first diode; the gate of the first FET is connected to the emitter of the first transistor; the drain of the first FET is grounded; the cathode of the first diode is grounded via the fourth capacitor and the fifth capacitor, respectively; the cathode of the first diode is grounded through a series circuit composed of the sixth resistor and the seventh resistor; the sixth capacitor is connected in parallel with the sixth resistor, and the cathode of the first diode is connected with the wiring terminal.

Wherein, in the voltage output circuit, a third end of the first integrated circuit is connected to the power supply voltage, which is then regulated and boosted though the first integrated circuit, and the boosted voltage is output from a fifth end of the first integrated circuit to control the conduction of the first transistor and the second transistor, so as to achieve a reliable output voltage regulation. At the same time, the first end of the first integrated circuit detects the divided voltages of the sixth resistor and of the seventh resistor, so that the output voltage can be collected and fed back in real time, thereby improving the stability of the output voltage. Moreover, in the circuit, the first integrated circuit can balance and convert the power of the output power source, thereby reducing the power consumption, reducing the loss, improving the electricity conversion rate and improving the practical value of the device.

Specifically, the voltage of the battery is collected through the thirteenth end to the fifteenth end of the fourth integrated circuit and is then monitored; when the voltage is too high or too low, a warning signal will be output, so as to improve the reliability of the device; the battery module comprises a battery protection circuit; the battery protection circuit comprises a second integrated circuit, a third integrated circuit, a fourth integrated circuit, a ninth resistor, a tenth resistor, an eleventh resistor, a twelfth resistor, a thirteenth resistor, a fourteenth resistor, a fifteenth resistor, a sixteenth resistor, a seventeenth resistor, a seventh capacitor, an eighth capacitor, a ninth capacitor, a tenth capacitor, an eleventh capacitor, and the twelfth capacitor; both the second integrated circuit and the third integrated circuit are of the type AO4459 A, the fourth integrated circuit is of the type S8254; a first end to a third end of the second integrated circuit are externally to a 12 V DC voltage power source; a fourth end of the second integrated circuit is connected to a first end of the fourth integrated circuit; a fifth end to an eighth end of the second integrated circuit are connected to a fifth end to an eighth end of the third integrated circuit; a fourth end of the third integrated circuit is connected to a third end of the fourth integrated circuit through the twelfth resistor; a first end to a third end of the third integrated circuit are connected to a sixteenth end of the fourth integrated circuit; a first end of the fourth integrated circuit is externally connected to a 12V DC voltage source through the eleventh resistor; a second end of the fourth integrated circuit is externally connected to a 12 V DC voltage power source through the ninth resistor; a fourth end of the fourth integrated circuit is grounded through the tenth resistor; a fifth end of the fourth integrated circuit is grounded through the series circuit composed of the seventh capacitor and the thirteenth resistor; a sixth end of the fourth integrated circuit is grounded through the series circuit composed of the eighth capacitor and the thirteenth resistor; a seventh end of the fourth integrated circuit is grounded through the thirteenth resistor; a tenth end of the fourth integrated circuit is grounded through the series circuit composed of the fourteenth resistor and the thirteenth resistor; both an eleventh end of the fourth integrated circuit and a twelfth end of the fourth integrated circuit are grounded through the thirteenth resistor; a thirteenth end of the fourth integrated circuit is connected to the seventeenth resistor and is, through the twelfth capacitor, connected to the sixteenth end of the fourth integrated circuit; a fourteenth end of the fourth integrated circuit is connected to the sixteenth resistor and is, through the eleventh capacitor, connected to the sixteenth end of the fourth integrated circuit; a fifteenth end of the fourth integrated circuit is connected to the fifteenth resistor and is, through the tenth capacitor, connected to the sixteenth end of the fourth integrated circuit; and a sixteenth end of the fourth integrated circuit is grounded through a series circuit composed of the ninth capacitor and the thirteenth resistor.

Specifically, the battery module is further provided with multiple series of 12 V batteries.

Specifically, SC8801 is capable of achieving an input power up to 24 W, thereby improving the practicability of the device, and the chip used in the voltage input adjustment module is of the type SC8801.

The beneficial effects of the present invention are as follows: in the device capable of achieving fast charge and fast discharge of a vehicle emergency starting power source, SC8801 is adopted, which is capable of achieving an input power up to 24 W, thereby improving the practicability of the device. Meanwhile, the Type-C QC3.0 protocol is adopted in the first output module, the USB QC3.0 protocol is adopted for the second output module, and the Type-C PD protocol is adopted for the third output module, so as to meet different charging needs and improve the practicality of the device. Moreover, in the voltage output circuit, the first integrated circuit can balance and convert the power of the output power source, thereby reducing the power consumption, reducing the loss, improving the electricity conversion rate and improving the practical value of the device.

BRIEF DESCRIPTION OF THE FIGURES

The following is a further description on the present invention with reference to the accompanying Figures and Embodiment.

In these figures: 1. input module, 2. voltage input adjustment module, 3. battery module, 4. voltage output adjustment module, 5. first output module, 6. second output module, 7. third output module, U1. first integrated circuit, U2. second integrated circuit, U3. third integrated circuit, U4. fourth integrated circuit, C1. first capacitor, C2. second capacitor, C3. third capacitor, C4. fourth capacitor, C5. fifth capacitor, C6. sixth capacitor, C7. seventh capacitor, C8. eighth capacitor, C9. ninth capacitor, C10. tenth capacitor, C11. eleventh capacitor, C12. twelfth capacitor, R1. first resistor, R2. second resistor, R3. third resistor, R4. fourth resistor, R5. fifth resistor, R6. sixth resistor, R7. seventh resistor, R8. eighth resistor, R9. ninth resistor, R10. tenth resistor, R11. eleventh resistor, R12. twelfth resistor, R13. thirteenth resistor, R14. fourteenth resistor, R15. fifteenth resistor, R16. sixteenth resistor, R17. seventeenth resistor, L1. inductor, VT1. first transistor, VT2. second transistor, Q1. first FET, Q2. second FET, Q3. third FET, VD1. first diode, VD2. second diode, J1. wiring terminal.

DETAILED DESCRIPTION OF THE EMBODIMENTS

The following is a further description on the present invention with reference to the accompanying Figures. All these figures are simplified schematic diagrams illustrating the basic structure of the present invention only in a schematic manner, so only those constitutions related to the present invention are shown.

As shown in FIG. 1 to FIG. 4, a device capable of achieving fast charge and fast discharge of a vehicle emergency starting source, it comprises an input module 1, a voltage input adjustment module 2, a battery module 3, a voltage output adjustment module 4, a first output module 5, a second output module 6 and a third output module 7, wherein, input module 1 is electrically connected to the battery module 3 through voltage input adjustment module 2, and battery module 3 is respectively connected to first output module 5, second output module 6 and third output module 7 through voltage output adjustment module 4.

Figure 3:
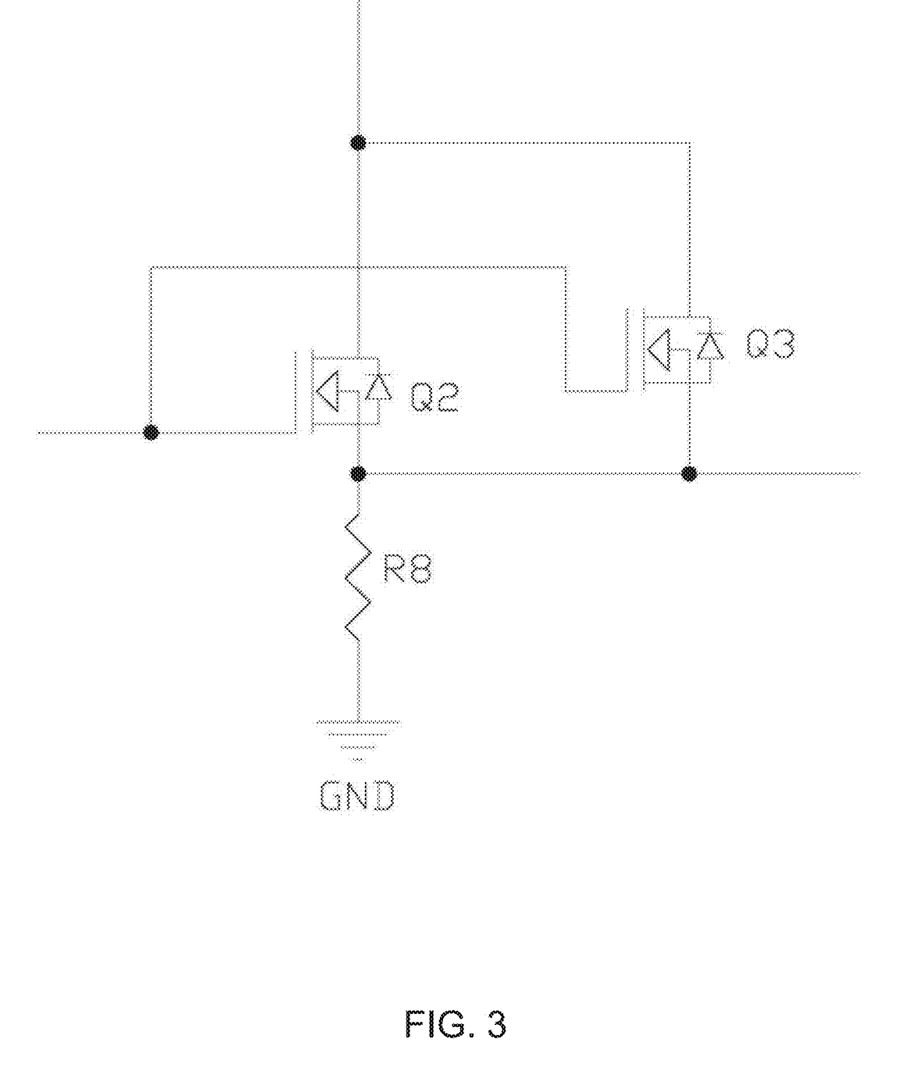
FIG. 3 is a circuit diagram for the current detection circuit of the structure of the device capable of achieving fast charge and fast discharge of a vehicle emergency starting power source as specified in the present invention.

The voltage output adjustment module 4 comprises a voltage output circuit and an output current detection circuit; the output current detection circuit is electrically connected to the voltage output circuit; the output current detection circuit comprises second a FET Q2, third a FET Q3 and an eighth resistor R8; the gate of the second FET Q2 is connected to the gate of third FET Q3; both the drain of the second FET Q2 and the drain of the third FET Q3 are grounded through the eighth resistor R8; and both the source of the second FET Q2 and the source of the third FET Q3 are connected to a wiring terminal J1.

Wherein, by controlling the conduction of the second field effect transistor (FET) Q2 and the third FET Q3, the second FET Q2 and the third FET Q3 can collect the output current, and then, the output current is collected by collecting the output voltage from the drain of the second FET Q2 and from the drain of the third FET Q3, thereby improving the reliability of the output circuit.

Figure 1:
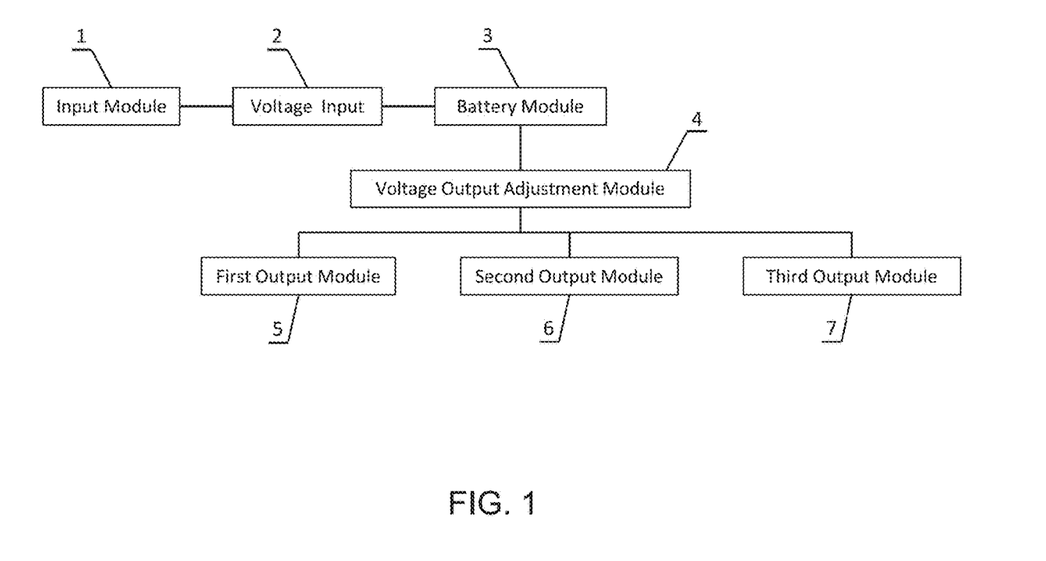
FIG. 1 is a schematic view of the structure of the device capable of achieving fast charge and fast discharge of a vehicle emergency starting power source as specified in the present invention.

The QC3.0 protocol is adopted in input module 1, the Type-C QC3.0 protocol is adopted in first output module 5, the USB QC3.0 protocol is adopted for second output module 6, and the Type-C PD protocol is adopted for third output module 7.

Wherein, when fast charging is needed, the power source will be connected through the input module 1 and using QC3.0 protocol, and then by the voltage input adjustment module 2, the input voltage and input power will be adjusted, so as to meet a variety of charging needs and improve the practicality of charging; then the adjusted voltage will be input to the battery module 3, so as to charge the battery; when fast discharging is needed, the battery module 3 will output electricity, and by the voltage output adjustment module 4, the output voltage and output power of the adjusted, thereby improving the electricity conversion efficiency and charging efficiency; finally, different charging devices are connected through the first output module 5, the second output module 6 and the third output module 7 respectively, so as to improve the practicability of the device; the Type-C QC3.0 protocol is adopted in the first output module 5, the USB QC3.0 protocol is adopted for the second output module 6, and the Type-C PD protocol is adopted for the third output module 7, so as to meet different charging needs.

Figure 2:
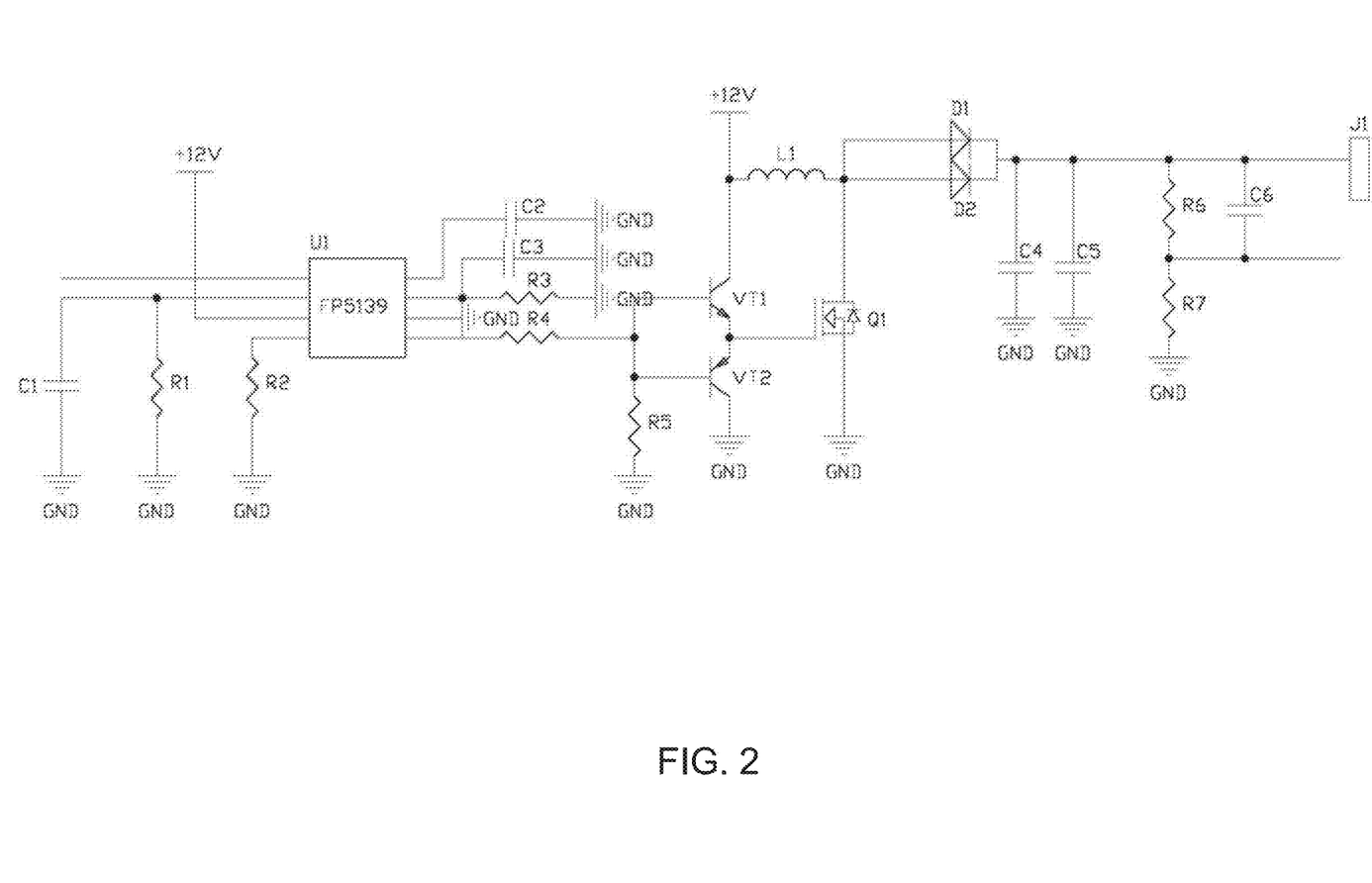
FIG. 2 is a circuit diagram for the voltage output circuit of the structure of the device capable of achieving fast charge and fast discharge of a vehicle emergency starting power source as specified in the present invention.

Specifically, the voltage output circuit comprises a first integrated circuit U1, a first capacitor C1, a second capacitor C2, a third capacitor C3, a fourth capacitor C4, a fifth capacitor C5, a sixth capacitor C6, a first resistor R1, a second resistor R2, a third resistor R3, a fourth resistor R4, a fifth resistor R5, a sixth resistor R6, a seventh resistor R7, an inductor L1, a first transistor VT1, a second transistor VT2, a first field effect transistor Q1, a first diode VD1, a second diode VD2 and a wiring terminal J1, wherein, first integrated circuit U1 is of the type FP5139; a first end of first integrated circuit U1 is connected to the sixth resistor R6 and the seventh resistor R7; a second end of the first integrated circuit U1 is grounded via the first capacitor C1 and the first resistor R1 respectively; a third end of the first integrated circuit U1 is externally connected to a 12V DC voltage source; a fourth end of the first integrated circuit U1 is grounded through a second resistor R2; an eighth end of the first integrated circuit U1 is grounded through a second capacitor C2; a seventh end of the first integrated circuit U1 is grounded via a third capacitor C3 and a third resistor R3 respectively; a sixth end of the first integrated circuit U1 is grounded; a fifth end of the first integrated circuit U1 is, through the fourth resistor R4, respectively connected to the base of the first transistor VT1 and to the base of the second transistor VT2; one end of the fifth resistor R5 is grounded; the other end of the fifth resistor R5 is respectively connected to the base of the first transistor VT1 and the base of the second transistor VT2; the emitter of the first transistor VT1 is connected to the emitter of the second transistor VT2; the collector of the first transistor VT1 is externally connected to an external 12V DC voltage source; the collector of the second transistor VT2 is grounded; the collector of the first transistor VT1 is, through the inductor L1, respectively connected to the anode of the first diode VD1 and the cathode of the first diode VD1; the source of the first field effect transistor (FET) Q1 is respectively connected to the anode of the first diode VD1 and the cathode of the first diode VD1; the gate of the first FET Q1 is connected to the emitter of the first transistor VT1; the drain of the first FET Q1 is grounded; the cathode of the first diode VD1 is grounded via the fourth capacitor C4 and the fifth capacitor C5, respectively; the cathode of the first diode VD1 is grounded through a series circuit composed of the sixth resistor R6 and the seventh resistor R7; the sixth capacitor C6 is connected in parallel with the sixth resistor R6, and the cathode of the first diode VD1 is connected with the wiring terminal J1.

Wherein, in the voltage output circuit, a third end of the first integrated circuit U1 is connected to the power supply voltage, which is then regulated and boosted though the first integrated circuit U1, and the boosted voltage is output from a fifth end of the first integrated circuit U1 to control the conduction of the first transistor and the second transistor VT2, so as to achieve a reliable output voltage regulation. At the same time, the first end of the first integrated circuit U1 detects the divided voltages of the sixth resistor R6 and of the seventh resistor R7, so that the output voltage can be collected and fed back in real time, thereby improving the stability of the output voltage. Moreover, in the circuit, the first integrated circuit U1 can balance and convert the power of the output power source, thereby reducing the power consumption, reducing the loss, improving the electricity conversion rate and improving the practical value of the device.

Figure 4:
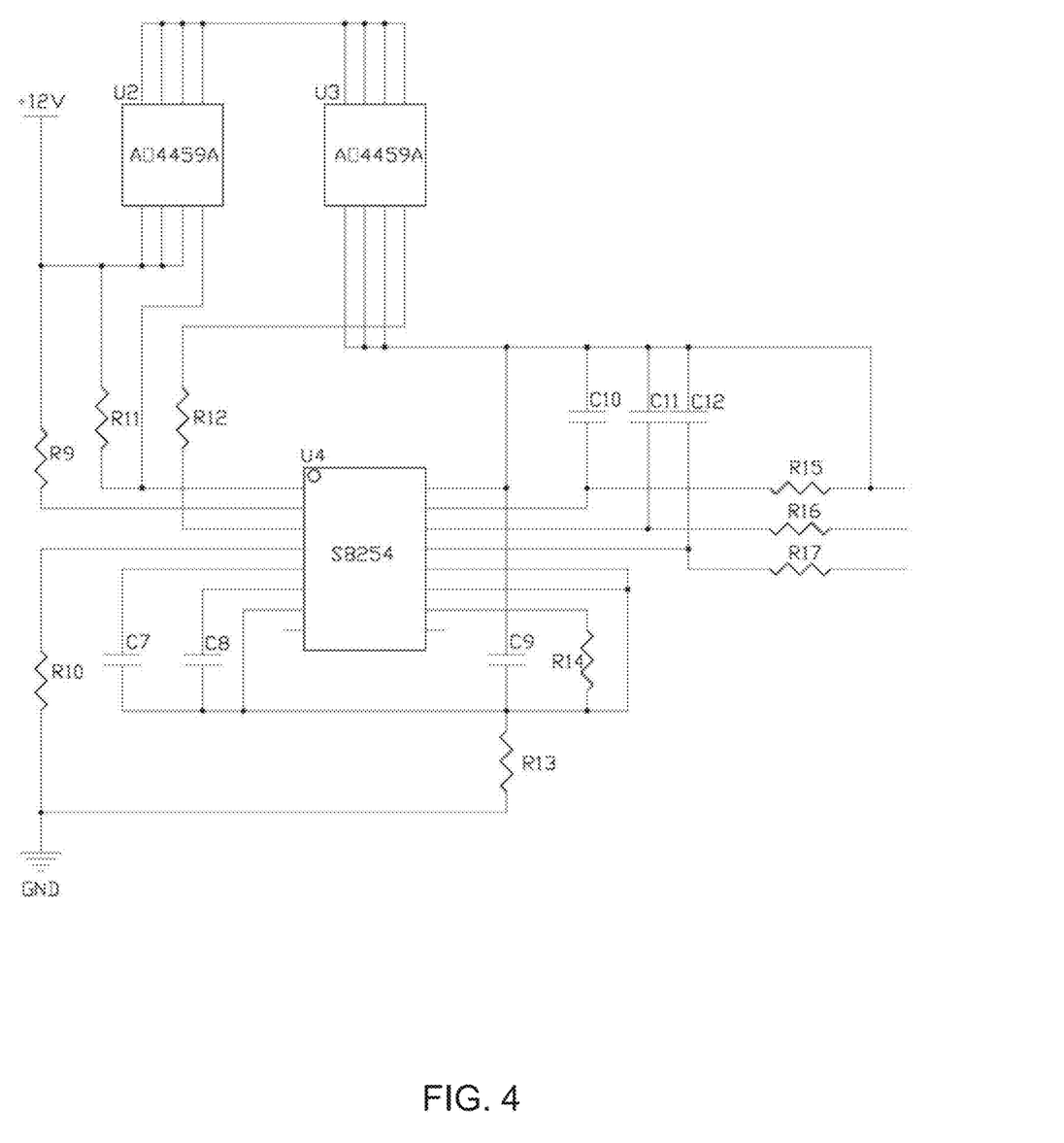
FIG. 4 is a circuit diagram for the battery protection circuit of the structure of the device capable of achieving fast charge and fast discharge of a vehicle emergency starting power source as specified in the present invention.

Specifically, the voltage of the battery is collected through the thirteenth end to the fifteenth end of the fourth integrated circuit U4 and is then monitored; when the voltage is too high or too low, a warning signal will be output, so as to improve the reliability of the device; the battery module comprises a battery protection circuit; the battery protection circuit comprises a second integrated circuit U2, a third integrated circuit U3, a fourth integrated circuit U4, a ninth resistor R9, a tenth resistor R10, an eleventh resistor R11, a twelfth resistor R12, a thirteenth resistor R13, a fourteenth resistor R14, a fifteenth resistor R15, a sixteenth resistor R16, a seventeenth resistor R17, a seventh capacitor C7, an eighth capacitor C8, a ninth capacitor C9, a tenth capacitor C10, an eleventh capacitor C11, and the twelfth capacitor C12; both the second integrated circuit U2 and the third integrated circuit U3 are of the type AO4459A, the fourth integrated circuit U4 is of the type S8254; a first end to a third end of the second integrated circuit U2 are externally to a 12V DC voltage power source; a fourth end of the second integrated circuit U2 is connected to a first end of the fourth integrated circuit U4; a fifth end to an eighth end of the second integrated circuit U2 are connected to a fifth end to an eighth end of the third integrated circuit U3; a fourth end of the third integrated circuit U3 is connected to a third end of the fourth integrated circuit U4 through the twelfth resistor R12; a first end to a third end of the third integrated circuit U3 are connected to a sixteenth end of the fourth integrated circuit U4; a first end of the fourth integrated circuit U4 is externally connected to a 12 V DC voltage source through the eleventh resistor R11; a second end of the fourth integrated circuit U4 is externally connected to a 12 V DC voltage power source through the ninth resistor R9; a fourth end of the fourth integrated circuit U4 is grounded through the tenth resistor R10; a fifth end of the fourth integrated circuit U4 is grounded through the series circuit composed of the seventh capacitor C7 and the thirteenth resistor R13; a sixth end of the fourth integrated circuit U4 is grounded through the series circuit composed of the eighth capacitor C8 and the thirteenth resistor R13; a seventh end of the fourth integrated circuit U4 is grounded through the thirteenth resistor R13; a tenth end of the fourth integrated circuit U4 is grounded through the series circuit composed of the fourteenth resistor R14 and the thirteenth resistor R13; both an eleventh end of the fourth integrated circuit U4 and a twelfth end of the fourth integrated circuit U4 are grounded through the thirteenth resistor R13; a thirteenth end of the fourth integrated circuit U4 is connected to the seventeenth resistor R17 and is, through the twelfth capacitor C12, connected to the sixteenth end of the fourth integrated circuit U4; a fourteenth end of the fourth integrated circuit U4 is connected to the sixteenth resistor R16 and is, through the eleventh capacitor C11, connected to the sixteenth end of the fourth integrated circuit U4; a fifteenth end of the fourth integrated circuit U4 is connected to the fifteenth resistor R15 and is, through the tenth capacitor C10, connected to the sixteenth end of the fourth integrated circuit U4; and a sixteenth end of the fourth integrated circuit U4 is grounded through a series circuit composed of the ninth capacitor C9 and the thirteenth resistor R13.

Specifically, the battery module 3 is further provided with multiple series of 12 V batteries.

Specifically, SC8801 is capable of achieving an input power up to 24 W, thereby improving the practicability of the device, and the chip used in the voltage input adjustment module 2 is of the type SC8801.

Compared with the prior art, in the device capable of achieving fast charge and fast discharge of a vehicle emergency starting power source, SC8801 is adopted, which is capable of achieving an input power up to 24 W, thereby improving the practicability of the device. Meanwhile, the Type-C QC3.0 protocol is adopted in the first output module 5, the USB QC3.0 protocol is adopted for the second output module 6, and the Type-C PD protocol is adopted for the third output module 7, so as to meet different charging needs and improve the practicality of the device. Moreover, in the voltage output circuit, the first integrated circuit U1 can balance and convert the power of the output power source, thereby reducing the power consumption, reducing the loss, improving the electricity conversion rate and improving the practical value of the device.

Inspired by the above preferred embodiments according to the present invention, and based on the above description, those skilled in the art absolutely can make various changes and modifications without departing from the technical thinking of the present invention. The technical scope of the present invention is not limited to the content of the specifications, and the technical scope thereof must be determined according to the scope of the Claims.

What is claimed is:

1. A device capable of achieving fast charge and fast discharge of a vehicle emergency starting source, comprising:
    an input module, a voltage input adjustment module, a battery module, a voltage output adjustment module, a first output module, a second output module and a third output module;
    wherein, the input module is electrically connected to the battery module through the voltage input adjustment module, and the battery module is respectively connected to the first output module, the second output module and the third output module through the voltage output adjustment module;
    wherein the voltage output adjustment module further comprises a voltage output circuit and an output current detection circuit, the output current detection circuit is electrically connected to the voltage output circuit;
    wherein the output current detection circuit comprises a second field effect transistor (FET), a third FET and an eighth resistor, the gate of the second FET is connected to the gate of the third FET, both the drain of the second FET and the drain of the third FET are grounded through the eighth resistor, and both the source of the second FET and the source of the third FET are connected to a wiring terminal of the voltage output circuit; and
    wherein a QC3.0 protocol is adopted in the input module, a Type-C QC3.0 protocol is adopted in the first output module, a USB QC3.0 protocol is adopted for the second output module, and a Type-C PD protocol is adopted for the third output module.

2. The device capable of achieving fast charge and fast discharge of a vehicle emergency starting source as specified in claim 1, wherein the voltage output circuit comprises a first integrated circuit, a first capacitor, a second capacitor, a third capacitor, a fourth capacitor, a fifth capacitor, a sixth capacitor, a first resistor, a second resistor, a third resistor, a fourth resistor, a fifth resistor, a sixth resistor, a seventh resistor, an inductor, a first transistor, a second transistor, a first field effect transistor, a first diode, a second diode and the wiring terminal, wherein, the first integrated circuit is of the type FP5139;

a first end of the first integrated circuit is connected to the sixth resistor and the seventh resistor;

a second end of the first integrated circuit is grounded via the first capacitor and the first resistor respectively;

a third end of the first integrated circuit is externally connected to a 12 V DC voltage source;

a fourth end of the first integrated circuit is grounded through the second resistor;

an eighth end of the first integrated circuit is grounded through the second capacitor;

a seventh end of the first integrated circuit is grounded via the third capacitor and the third resistor respectively;

a sixth end of the first integrated circuit is grounded;

a fifth end of the first integrated circuit is, through the fourth resistor, respectively connected to a base of the first transistor and to a base of the second transistor;

one end of the fifth resistor is grounded;

an other end of the fifth resistor is respectively connected to the base of the first transistor and the base of the second transistor;

an emitter of the first transistor is connected to an emitter of the second transistor;

a collector of the first transistor is externally connected to an external 12 V DC voltage source;

a collector of the second transistor is grounded;

the collector of the first transistor is, through an inductor, respectively connected to an anode of the first diode and a cathode of the first diode;

a source of the first field effect transistor (FET) is respectively connected to the anode of the first diode and the cathode of the first diode;

a gate of the first FET is connected to the emitter of the first transistor;

a drain of the first FET is grounded;

the cathode of the first diode is grounded via the fourth capacitor and the fifth capacitor, respectively;

the cathode of the first diode is grounded through a series circuit composed of the sixth resistor and the seventh resistor; and     the sixth capacitor is connected in parallel with the sixth resistor, and the cathode of the first diode is connected with the wiring terminal.

3. The device capable of achieving fast charge and fast discharge of a vehicle emergency starting source as specified in claim 1, wherein the battery module comprises a battery protection circuit, the battery protection circuit comprises a second integrated circuit, a third integrated circuit, a fourth integrated circuit, a ninth resistor, a tenth resistor, an eleventh resistor, a twelfth resistor, a thirteenth resistor, a fourteenth resistor, a fifteenth resistor, a sixteenth resistor, a seventeenth resistor, a seventh capacitor, an eighth capacitor, a ninth capacitor, a tenth capacitor, an eleventh capacitor, and a twelfth capacitor;

both the second integrated circuit and the third integrated circuit are of the type AO4459A, the fourth integrated circuit is of the type S8254;

a first end to a third end of the second integrated circuit are externally to a 12 V DC voltage power source;

a fourth end of the second integrated circuit is connected to a first end of the fourth integrated circuit;

a fifth end to an eighth end of the second integrated circuit are connected to a fifth end to an eighth end of the third integrated circuit;

a fourth end of the third integrated circuit is connected to a third end of the fourth integrated circuit through the twelfth resistor;

a first end to a third end of the third integrated circuit are connected to a sixteenth end of the fourth integrated circuit;

the first end of the fourth integrated circuit is externally connected to a 12 V DC voltage source through the eleventh resistor;

a second end of the fourth integrated circuit is externally connected to a 12 V DC voltage power source through the ninth resistor;

a fourth end of the fourth integrated circuit is grounded through the tenth resistor;

a fifth end of the fourth integrated circuit is grounded through a series circuit composed of the seventh capacitor and the thirteenth resistor;

a sixth end of the fourth integrated circuit is grounded through a series circuit composed of the eighth capacitor and the thirteenth resistor;

a seventh end of the fourth integrated circuit is grounded through the thirteenth resistor;

a tenth end of the fourth integrated circuit is grounded through a series circuit composed of the fourteenth resistor and the thirteenth resistor;

both an eleventh end of the fourth integrated circuit and a twelfth end of the fourth integrated circuit are grounded through the thirteenth resistor;

a thirteenth end of the fourth integrated circuit is connected to the seventeenth resistor and is, through the twelfth capacitor, connected to the sixteenth end of the fourth integrated circuit;

a fourteenth end of the fourth integrated circuit is connected to the sixteenth resistor and is, through the eleventh capacitor, connected to the sixteenth end of the fourth integrated circuit;

a fifteenth end of the fourth integrated circuit is connected to the fifteenth resistor and is, through the tenth capacitor, connected to the sixteenth end of the fourth integrated circuit; and     the sixteenth end of the fourth integrated circuit is grounded through a series circuit composed of the ninth capacitor and the thirteenth resistor.

4. The device capable of achieving fast charge and fast discharge of a vehicle emergency starting source as specified in claim 1, wherein the battery module is further provided with multiple series of 12 V batteries.

5. The device capable of achieving fast charge and fast discharge of a vehicle emergency starting source as specified in claim 1, wherein a chip used in the voltage input adjustment module is of the type SC8801.

6. A device capable of achieving fast charge and fast discharge of a vehicle emergency starting source, comprising:

an input module, a voltage input adjustment module, a battery module, a voltage output adjustment module, a first output module, a second output module and a third output module;

wherein, the input module is electrically connected to the battery module through the voltage input adjustment module, and the battery module is respectively connected to the first output module, the second output module and the third output module through the voltage output adjustment module;

wherein the voltage output adjustment module further comprises a voltage output circuit and an output current detection circuit, the output current detection circuit is electrically connected to the voltage output circuit;

wherein the voltage output circuit comprises a first integrated circuit, a first capacitor, a second capacitor, a third capacitor, a fourth capacitor, a fifth capacitor, a sixth capacitor, a first resistor, a second resistor, a third resistor, a fourth resistor, a fifth resistor, a sixth resistor, a seventh resistor, an inductor, a first transistor, a second transistor, a first field effect transistor (FET), a first diode, a second diode and a wiring terminal;

wherein, the first integrated circuit is of the type FP5139, the first integrated circuit includes:

a first end connected to the sixth resistor and the seventh resistor;

a second end grounded via the first capacitor and the first resistor respectively;

a third end externally connected to a 12 V DC voltage source;

a fourth end grounded through the second resistor;

a fifth end connected to a base of the first transistor and to a base of the second transistor through the fourth resistor;

a sixth end grounded;

a seventh end grounded via the third capacitor and the third resistor, respectively; and an eighth end grounded through the second capacitor;

wherein one end of the fifth resistor is grounded and an other end of the fifth resistor connected to the base of the first transistor and the base of the second transistor;

wherein an emitter of the first transistor is connected to an emitter of the second transistor;

wherein a collector of the first transistor is externally connected to an external 12 V DC voltage source and is connected to an anode of the first diode and a cathode of the first diode;

wherein a collector of the second transistor is grounded;

wherein a source of the first FET is connected to the anode of the first diode and the cathode of the first diode, a gate of the first FET is connected to the emitter of the first transistor, and a drain of the first FET is grounded;

wherein the cathode of the first diode is grounded through the fourth capacitor and the fifth capacitor and through a series circuit composed of the sixth resistor and the seventh resistor, and is connected with the wiring terminal;

wherein the sixth capacitor is connected in parallel with the sixth resistor; and wherein the output current detection circuit comprises a second FET, a third FET and an eighth resistor, the gate of the second FET is connected to the gate of the third FET, both the drain of the second FET and the drain of the third FET are grounded through the eighth resistor, and both the source of the second FET and the source of the third FET are connected to the wiring terminal.

7. The device of claim 6, wherein a QC3.0 protocol is adopted in the input module, a Type-C QC3.0 protocol is adopted in the first output module, a USB QC3.0 protocol is adopted for the second output module, and a Type-C PD protocol is adopted for the third output module.

8. The device of claim 6, wherein the battery module comprises a battery protection circuit, the battery protection circuit comprises a second integrated circuit, a third integrated circuit, a fourth integrated circuit, a ninth resistor, a tenth resistor, an eleventh resistor, a twelfth resistor, a thirteenth resistor, a fourteenth resistor, a fifteenth resistor, a sixteenth resistor, a seventeenth resistor, a seventh capacitor, an eighth capacitor, a ninth capacitor, a tenth capacitor, an eleventh capacitor, and a twelfth capacitor;

both the second integrated circuit and the third integrated circuit are of the type AO4459A, the fourth integrated circuit is of the type S8254;

a first end to a third end of the second integrated circuit are externally to a 12 V DC voltage power source;

a fourth end of the second integrated circuit is connected to a first end of the fourth integrated circuit;

a fifth end to an eighth end of the second integrated circuit are connected to a fifth end to an eighth end of the third integrated circuit;

a fourth end of the third integrated circuit is connected to a third end of the fourth integrated circuit through the twelfth resistor;

a first end to a third end of the third integrated circuit are connected to a sixteenth end of the fourth integrated circuit;

the first end of the fourth integrated circuit is externally connected to a 12 V DC voltage source through the eleventh resistor;

a second end of the fourth integrated circuit is externally connected to a 12 V DC voltage power source through the ninth resistor;

a fourth end of the fourth integrated circuit is grounded through the tenth resistor;

a fifth end of the fourth integrated circuit is grounded through a series circuit composed of the seventh capacitor and the thirteenth resistor;

a sixth end of the fourth integrated circuit is grounded through a series circuit composed of the eighth capacitor and the thirteenth resistor;

a seventh end of the fourth integrated circuit is grounded through the thirteenth resistor;

a tenth end of the fourth integrated circuit is grounded through a series circuit composed of the fourteenth resistor and the thirteenth resistor;

both an eleventh end of the fourth integrated circuit and a twelfth end of the fourth integrated circuit are grounded through the thirteenth resistor;

a thirteenth end of the fourth integrated circuit is connected to the seventeenth resistor and is, through the twelfth capacitor, connected to the sixteenth end of the fourth integrated circuit;

a fourteenth end of the fourth integrated circuit is connected to the sixteenth resistor and is, through the eleventh capacitor, connected to the sixteenth end of the fourth integrated circuit;

a fifteenth end of the fourth integrated circuit is connected to the fifteenth resistor and is, through the tenth capacitor, connected to the sixteenth end of the fourth integrated circuit; and the sixteenth end of the fourth integrated circuit is grounded through a series circuit composed of the ninth capacitor and the thirteenth resistor.

9. The device of claim 6, wherein the battery module is further provided with multiple series of 12 V batteries.

10. The device of claim 6, wherein a chip used in the voltage input adjustment module is of the type SC8801.

11. An electrical circuit, comprising:

a voltage output circuit including a first integrated circuit, a first capacitor, a second capacitor, a third capacitor, a fourth capacitor, a fifth capacitor, a sixth capacitor, a first resistor, a second resistor, a third resistor, a fourth resistor, a fifth resistor, a sixth resistor, a seventh resistor, an inductor, a first transistor, a second transistor, a first field effect transistor (FET), a first diode, a second diode and a wiring terminal;

wherein, the first integrated circuit is of the type FP5139, the first integrated circuit includes:

a first end connected to the sixth resistor and the seventh resistor;

a second end grounded via the first capacitor and the first resistor respectively;

a third end externally connected to a 12 V DC voltage source;

a fourth end grounded through the second resistor;

a fifth end connected to a base of the first transistor and to a base of the second transistor through the fourth resistor;

a sixth end grounded;

a seventh end grounded via the third capacitor and the third resistor, respectively; and an eighth end grounded through the second capacitor;

wherein one end of the fifth resistor is grounded and an other end of the fifth resistor connected to the base of the first transistor and the base of the second transistor;

wherein an emitter of the first transistor is connected to an emitter of the second transistor;

wherein a collector of the first transistor is externally connected to an external 12 V DC voltage source and is connected to an anode of the first diode and a cathode of the first diode;

wherein a collector of the second transistor is grounded;

wherein a source of the first FET is connected to the anode of the first diode and the cathode of the first diode, a gate of the first FET is connected to the emitter of the first transistor, and a drain of the first FET is grounded;

wherein the cathode of the first diode is grounded through the fourth capacitor and the fifth capacitor and through a series circuit composed of the sixth resistor and the seventh resistor, and is connected with the wiring terminal; and wherein the sixth capacitor is connected in parallel with the sixth resistor.

12. The electrical circuit of claim 11, further comprising an output current detection circuit electrically connected to the voltage output circuit, the output current detection circuit including a second FET, a third FET and an eighth resistor, the gate of the second FET is connected to the gate of the third FET, both the drain of the second FET and the drain of the third FET are grounded through the eighth resistor, and both the source of the second FET and the source of the third FET are connected to the wiring terminal.

13. The electrical circuit of claim 12, further comprising a battery protection circuit including a second integrated circuit, a third integrated circuit, a fourth integrated circuit, a ninth resistor, a tenth resistor, an eleventh resistor, a twelfth resistor, a thirteenth resistor, a fourteenth resistor, a fifteenth resistor, a sixteenth resistor, a seventeenth resistor, a seventh capacitor, an eighth capacitor, a ninth capacitor, a tenth capacitor, an eleventh capacitor, and a twelfth capacitor;

both the second integrated circuit and the third integrated circuit are of the type AO4459A, the fourth integrated circuit is of the type S8254;

a first end to a third end of the second integrated circuit are externally to a 12 V DC voltage power source;

a fourth end of the second integrated circuit is connected to a first end of the fourth integrated circuit;

a fifth end to an eighth end of the second integrated circuit are connected to a fifth end to an eighth end of the third integrated circuit;

a fourth end of the third integrated circuit is connected to a third end of the fourth integrated circuit through the twelfth resistor;

a first end to a third end of the third integrated circuit are connected to a sixteenth end of the fourth integrated circuit;

the first end of the fourth integrated circuit is externally connected to a 12 V DC voltage source through the eleventh resistor;

a second end of the fourth integrated circuit is externally connected to a 12 V DC voltage power source through the ninth resistor;

a fourth end of the fourth integrated circuit is grounded through the tenth resistor;

a fifth end of the fourth integrated circuit is grounded through a series circuit composed of the seventh capacitor and the thirteenth resistor;

a sixth end of the fourth integrated circuit is grounded through a series circuit composed of the eighth capacitor and the thirteenth resistor;

a seventh end of the fourth integrated circuit is grounded through the thirteenth resistor;

a tenth end of the fourth integrated circuit is grounded through a series circuit composed of the fourteenth resistor and the thirteenth resistor;

both an eleventh end of the fourth integrated circuit and a twelfth end of the fourth integrated circuit are grounded through the thirteenth resistor;

a thirteenth end of the fourth integrated circuit is connected to the seventeenth resistor and is, through the twelfth capacitor, connected to the sixteenth end of the fourth integrated circuit;

a fourteenth end of the fourth integrated circuit is connected to the sixteenth resistor and is, through the eleventh capacitor, connected to the sixteenth end of the fourth integrated circuit;

a fifteenth end of the fourth integrated circuit is connected to the fifteenth resistor and is, through the tenth capacitor, connected to the sixteenth end of the fourth integrated circuit; and the sixteenth end of the fourth integrated circuit is grounded through a series circuit composed of the ninth capacitor and the thirteenth resistor.

14. The electrical circuit of claim 13, wherein the voltage output circuit is coupled to a first output module, a second output module, and a third output module.

15. The electrical circuit of claim 14, wherein a Type-C QC3.0 protocol is adopted in the first output module, a USB QC3.0 protocol is adopted for the second output module, and a Type-C PD protocol is adopted for the third output module.

* * * * *

UNITED STATES PATENT AND TRADEMARK OFFICE
CERTIFICATE OF CORRECTION

PATENT NO. : 10,840,710 B2  
APPLICATION NO. : 15/926944  
DATED : November 17, 2020  
INVENTOR(S) : Lin Jiarong Page 1 of 1

It is certified that error appears in the above-identified patent and that said Letters Patent is hereby corrected as shown below:

On the Title Page

At item (72) Inventor: Please delete "Shenzhen" and replace with -- Shenzhen City --.

At item (73) Assignee: Please delete "USA Human International Group LLC" and replace with -- USA Huanen International Group LLC --.

Signed and Sealed this  
Ninth Day of March, 2021

Drew Hirshfeld  
*Performing the Functions and Duties of the*  
*Under Secretary of Commerce for Intellectual Property and*  
*Director of the United States Patent and Trademark Office*